US010684402B2

United States Patent
Buehler et al.

(10) Patent No.: US 10,684,402 B2
(45) Date of Patent: Jun. 16, 2020

(54) BIREFRINGENT DEVICE WITH APPLICATION SPECIFIC PUPIL FUNCTION AND OPTICAL DEVICE

(71) Applicant: Sony Corporation, Tokyo (JP)

(72) Inventors: Daniel Buehler, Kirchheim (DE); Markus Kamm, Karlsruhe (DE); Marco Hering, Munich (DE)

(73) Assignee: SONY CORPORATION, Tokyo (JP)

( * ) Notice: Subject to any disclaimer, the term of this patent is extended or adjusted under 35 U.S.C. 154(b) by 827 days.

(21) Appl. No.: 14/470,714

(22) Filed: Aug. 27, 2014

(65) Prior Publication Data

US 2014/0362332 A1     Dec. 11, 2014

Related U.S. Application Data

(62) Division of application No. 13/500,773, filed as application No. PCT/EP2010/006296 on Oct. 14, 2010, now abandoned.

(30) Foreign Application Priority Data

Oct. 15, 2009  (EP) ...................................... 09013046

(51) Int. Cl.
*G02B 5/30*        (2006.01)
*G02B 27/00*       (2006.01)
*G02F 1/13363*     (2006.01)

(52) U.S. Cl.
CPC ....... *G02B 5/3083* (2013.01); *G02B 27/0075* (2013.01); *G02F 1/13363* (2013.01); *G02B 2207/129* (2013.01)

(58) Field of Classification Search
CPC .... G02B 27/28; G02B 27/283; G02B 27/288; G02B 5/3083; G02B 5/305; G02B 5/3008;
(Continued)

(56) References Cited

U.S. PATENT DOCUMENTS 7,061,693 B2   6/2006  Zalevsky
7,405,883 B2   7/2008  Hashimoto
(Continued)

FOREIGN PATENT DOCUMENTS

EP   1 260 849        11/2003
WO      86 01345       2/1986
WO   2007 122615      11/2007

OTHER PUBLICATIONS

McEldowney et al (Vortex Retarders produced from photo-aligned liquid crystal polymers, May 12, 2008, vol. 16, No. 10, Optics Exp, pp. 7295-7308).*
(Continued)

*Primary Examiner* — Jade R Chwasz
*Assistant Examiner* — Jyotsna V Dabbi
(74) *Attorney, Agent, or Firm* — Xsensus LLP

(57) ABSTRACT

A birefringent device, which is configured to be mounted in an optical path of an optical system, has an effective area in a pupil plane. The birefringent device affects different polarization states differently and position-dependently. The birefringent device realizes a first pupil function assigned to a first polarization state and a second different pupil function assigned to a second polarization state. The pupil functions may be optimized to achieve various specific optical properties like extended depth of field.

9 Claims, 6 Drawing Sheets

(58) Field of Classification Search
CPC .... G02B 5/3025; G02B 5/3016; G02B 5/286;
G02B 5/30; G02B 5/32; G02B 5/3058;
G02B 6/278; G02B 1/08; G02B 1/06;
G02B 3/10; G02F 1/13363; G02F 1/13;
G02F 1/133528; G02F 2001/133545;
G02F 2001/133526; B82Y 20/00; G03F
7/70966; G01J 3/14; B29C 33/0038;
B29D 11/00413; A61F 2/1618; F21L
15/04; F21V 9/14
USPC ...................................... 359/489.01, 483.01
See application file for complete search history.

(56) References Cited

U.S. PATENT DOCUMENTS

| | | | |
|---|---|---|---|
| 2002/0080462 A1* | 6/2002 | Patel | G02B 6/266 359/256 |
| 2002/0176166 A1 | 11/2002 | Schuster | |
| 2006/0027162 A1* | 2/2006 | Kato | C30B 1/00 117/92 |
| 2006/0221453 A1* | 10/2006 | Koehler | G02B 5/3083 359/619 |
| 2009/0116096 A1 | 5/2009 | Zalevsky et al. | |
| 2009/0147378 A1 | 6/2009 | Zalevsky et al. | |

OTHER PUBLICATIONS

Ren et al (Inhomogeneous nanoscale polymer-dispersed liquid crystals with gradient refractive index, Nov. 4, 2002, vol. 81, No. 19, Applied Phys Lett., pp. 3537-3539).*

Chakraborty et al (The optical transfer function of a perfect lens with polarisation masks, J. Optics (Paris), vol. 9, No. 4, pp. 251-254, Feb. 22, 1978).*

Mandal, S., et al., "Imaging characteristics of a birefringent lens under broadband illumination," Optik, vol. 118, No. 7, pp. 335-339, (Jun. 5, 2007).

Sanyal, S., et al., "High tolerance to off-axis aberrations with a birefringent lens," Optical Engineering, vol. 43, No. 6, pp. 1381-1386, (Jun. 1, 2004).

Unno, Y., "Point-spread function for a rotationally symmetric birefringent lens," Optical Society of America, vol. 19, No. 4, pp. 781-791, (Apr. 2002).

Chi, W., et al., "Polarization coded aperture," Optics Express, vol. 14, No. 15, pp. 6634-6642, (Jul. 24, 2006).

McEldowney, S.C., et al., "Vortex retarders produced from photo-aligned liquid crystal polymers," Optics Express, vol. 16, No. 10, pp. 7295-7308, (May 12, 2008).

Stalder, M., et al., "Linearly polarized light with axial symmetry generated by liquid-crystal polarization converters," Optics Letters, vol. 21, No. 23, pp. 1948-1950, (Dec. 1, 1996).

Moreno, I., et al., "Binary polarization pupil filter: Theoretical analysis and experimental realization with a liquid crystal display," Optics Communications, vol. 264, No. 1, pp. 63-69, (Aug. 1, 2006).

Davis, J.A., et al., "Programmable birefringent lenses with a liquid-crystal display," Applied Optics, vol. 43, No. 34, pp. 6235-6241, (Dec. 1, 2004).

Dowski, E.R., et al., "Extended depth of field through wave-front coding," Applied Optics, vol. 34, No. 11, pp. 1859-1866, (Apr. 10, 1995).

Bhattacharya, K., et al., "Simulation of effects of phase and amplitude coatings on the lens aperture with polarization masks," Journal of the Optical Society of America, vol. 11, No. 2, pp. 586-592, (Feb. 1994).

Asakura, T., et al., "Diffraction by Circular Apertures with a Ring-Shaped π-Phase Change," Japanese Journal of Applied Physics, Vo. 9, No. 2, pp. 195-202, (Feb. 1970).

Sanyal, S., et al., "Frequency response characteristics of a birefringent lens," Optical Engineering, vol. 41, No. 3, pp. 592-597, (Mar. 2002).

Sochacki, J., et al., "Nonparaxial design of generalized axicons," Applied Optics, vol. 31, No. 25, pp. 5326-5330, (Sep. 1, 1992).

Welford, W.T., "Use of Annular Apertures to Increase Focal Depth," Journal of the Optical Society of America, vol. 50, No. 8, pp. 749-753, (Aug. 1960).

Zalevsky, Z., et al., "Extended depth of focus imaging with birefringent plate," Optics Express, vol. 15, No. 12, pp. 7202-7210, (Jun. 11, 2007).

Prasad, S., et al., "Engineering the Pupil Phase to Improve Image Quality," Proceedings of the SPIE Visual Information Processing XII, vol. 5108, Total 12 Pages, (Apr. 2003).

Haeusler, G., "A method to increase the depth of focus by two step image processing," Optics Communications, vol. 6, No. 1, pp. 38-42, (1972).

Guichard, F., et al., "Extended depth-of-field using sharpness transport across color channels," Society of Photo-Optical Instrumentation Engineers, Total 13 Pages, (2009).

Sherif, S.S., et al., "Reduced depth of field in incoherent hybrid imaging systems," Applied Optics, vol. 41, No. 29, pp. 6062-6074, (Oct. 10, 2002).

Cathey, W.T., et al., "New paradigm for imaging systems," Applied Optics, vol. 41, No. 29, pp. 6080-6092, (Oct. 10, 2002).

Zalevsky, Z., et al., "All-optical axial super resolving imaging using a low-frequency binary-phase mask," Optics Express, vol. 14, No. 7, pp. 2631-2643, (Apr. 3, 2006).

Goodman, J.W., "Frequency Analysis of Optical Imaging Systems," Introduction to Fourier Optics, Third Edition, Chapter 6 pp. 152-155, (2005).

Mawet, D., et al., "The Vector Vortex Coronagraph: Laboratory Results and First Light at Palomar Observatory," ApJ, pp. 1-6, (2010).

International Search Report dated Apr. 4, 2011 in PCT/EP10/06296 Filed Oct. 14, 2010.

* cited by examiner

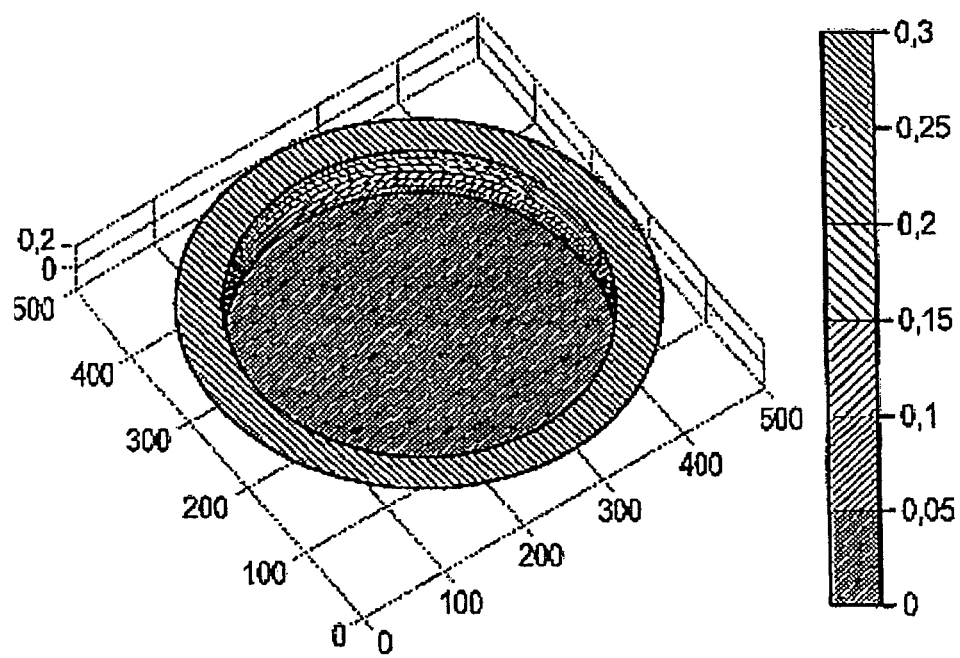
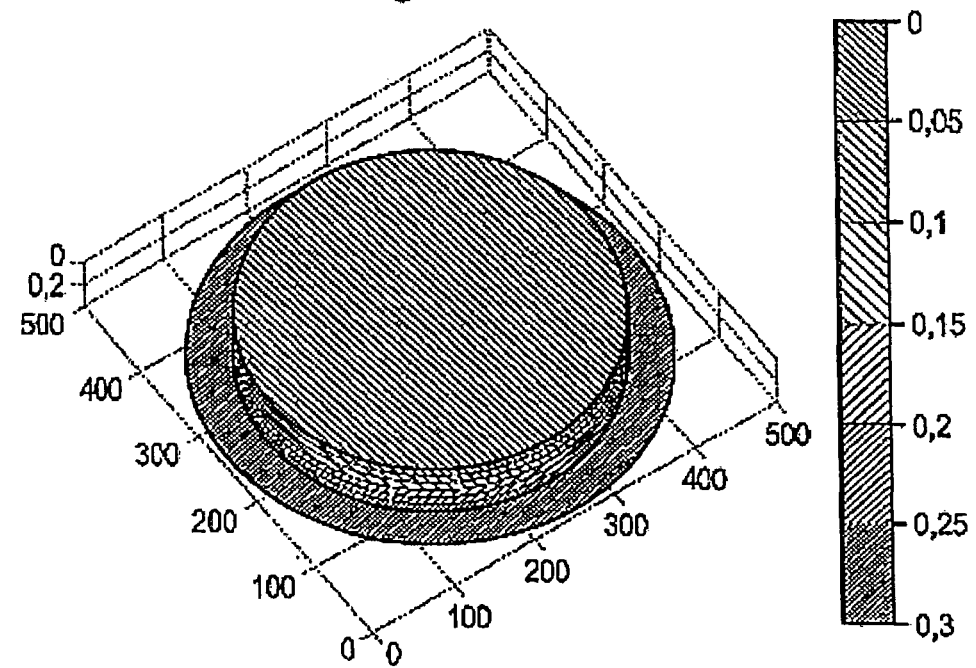

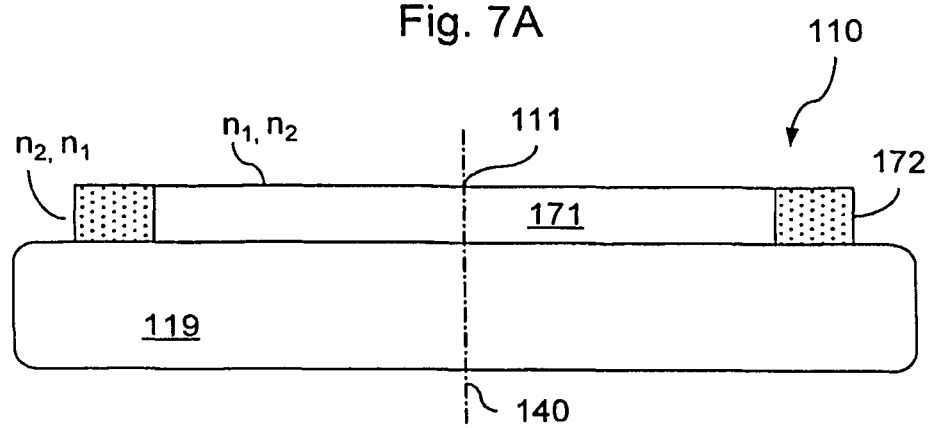
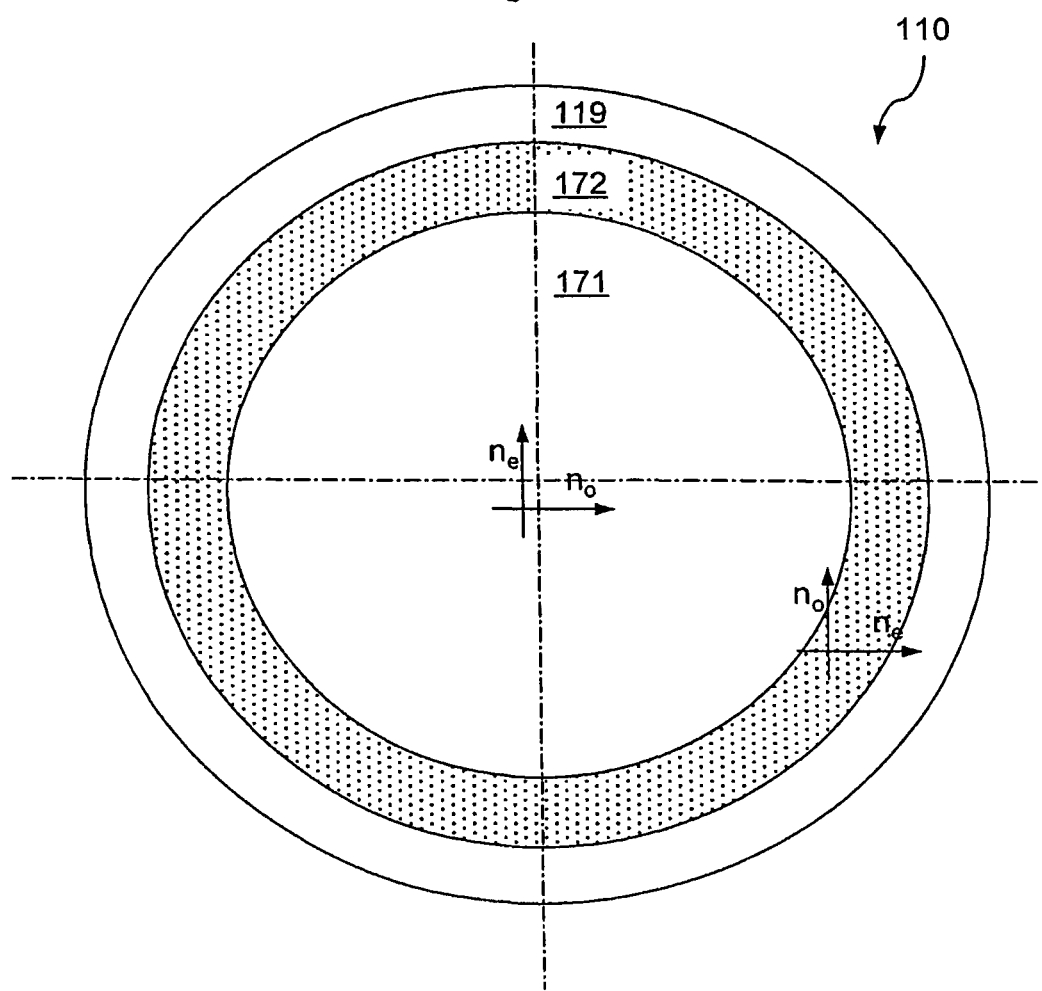

BIREFRINGENT DEVICE WITH APPLICATION SPECIFIC PUPIL FUNCTION AND OPTICAL DEVICE

CROSS REFERENCE TO RELATED APPLICATIONS

The present application is a Divisional application of U.S. Ser. No. 13/500,773, filed Jul. 19, 2012, the entire contents of which are incorporated herein by reference. U.S. Ser. No. 13/500,773 is a National Stage application of PCT/EP10/006296, filed Oct. 14, 2010, and claims priority to EP 09013046.9, filed Oct. 15, 2009.

Embodiments of the invention relate to the field of imaging techniques, to application specific birefringent devices used in optical imaging devices, optical systems including the birefringent device and methods for designing and manufacturing birefringent devices.

In optical devices like cameras for consumer, industrial or medical applications conventional focusing techniques are based, for example, on the use of a multitude of lenses and a focusing device that is moved with respect to an image plane. Alternatively, the depth of field may be extended. The various EDoF (extended depth of field) techniques can be assigned to one of the following approaches respectively:

In accordance with a first approach, the focus position may be shifted across a broad range of distances during exposure. The image is reconstructed by means of a deconvolution process in an image post-processing unit.

A second approach is based on wavelength separation. For example, Guichard: "Extended Depth-of-Field Using Sharpness Transport across Color Channels"; SPIE; Proceedings of Electronic Imaging; 2009 relies on a robust estimator that determines the colour channel for which the object is in focus, i.e. sharply imaged. High spatial frequencies are transported into the other colour channels for which the object is out of focus and hence slightly blurred.

A third approach refers to techniques providing a PSF (point spread function) or, equivalently, a MTF (modulation transfer function) that is sufficiently defocus-invariant, i.e. constant for a large range of object distances. In general, these techniques shape the pupil function of an optical system in a way to generate the defocus-invariant PSF or MTF.

Since the pupil function is a complex function, the third approach techniques can be assigned to one of two sub-categories respectively. The first sub-category refers to shaping the phase of the pupil function and the second one to shaping the amplitude of the pupil function.

As an example of the first sub-category, Dowski and Cathey: "Extended depth of field through wavefront coding"; Applied Optics; Vol. 34. No. 11, 1995 and U.S. Pat. No. 5,748,371 describe a wavefront coding technique which provides affecting only the phase of the pupil function for avoiding intensity loss in the transmitted light.

An example for shaping the pupil function to obtain a desired PSF but without targeting EDoF is discussed in Bhattacharya, Chakraborty and Ghosh: "Simulation of Effects of Phase and Amplitude Coatings on the Lens Aperture with Polarization Masks"; J. Opt. Soc. Am. A; Vol. 11, No. 2; February 1994, where the effects of a pupil mask with a central portion masked by a first polarizer having a first transmission axis and an annular portion masked by a second polarizer having a second, different transmission axis are simulated. As another example, Asakura and Mishina: "Diffraction by Circular Apertures with a Ring-Shaped π-Phase Change"; Japanese Journal of Applied Physics; Vo. 9; No. 2 February 1970 deal with the three-dimensional irradiance distribution by circular apertures with a ring-shaped π-phase change.

Another example of shaping the phase of the pupil function is described by Sanyal and Ghosh: "Frequency Response Characteristics of a Birefringent Lens"; Applied Optics; Vol. 31; No. 25; 1992. They provide a birefringent lens made of an uniaxial crystal, whose optic axis is perpendicular to the principal axis and which is placed between two linear polarizers for defining an amplitude mask, a phase mask, a complex mask or a polarization mask.

In addition, U.S. Pat. No. 7,061,693 refers to an arrangement including an imaging lens and an optical element configured as a phase-affecting, non-diffractive optical element, in other words a phase mask, defining a spatially low frequency phase transition.

As an example of a method of the second sub-category, Welford: "Use of Annular Apertures to Increase Focal Depth"; J. Opt. Soc. Am. A; Vol. 50; 1960 refers to a method manipulating or shaping the amplitude of the pupil function in order to increase the depth of field.

A fourth EDoF approach relies on polarization separation. For example, WO2007/122615 refers to a birefringent plate, which is configured such that a refraction index of this plate for a light component of one polarization state passes an effective optical path to the detector plane as if the detector is positioned in an imaging plane corresponding to a far-field imaging condition, and a refractive index for a light component of the other polarization state passes through the effective optical path to the detector plane as if the detector is positioned as required for a near-field imaging condition. The focal planes for the two polarization states are axially displaced to each other. An image post-processing process is provided to restore the original image from the degraded image received at the detector plane.

U.S. Pat. No. 7,405,883 refers to an optical low-pass filter and describes a method of manufacturing optical components for phase control of light by generating refractive index-change regions in a transparent device through multi-photo absorption processes induced by irradiation with a pulsed laser beam.

It is an object of the invention to provide optical systems for optical devices with improved imaging characteristics. This object is achieved by the subject-matter of the independent claims. Further embodiments are defined in the dependent claims respectively. Details of the invention will become more apparent form the following description of embodiments in connection with the accompanying drawings. Features of the different embodiments may be combined unless they exclude each other.

FIG. 4A is a schematic diagram showing a discretized angle of the pupil function for a first polarization direction provided by a birefringent device according to an embodiment.

FIG. 4B is a schematic diagram showing a discretized angle of the pupil function for a second polarization direction provided by the birefringent device of FIG. 4A.

FIG. 7A is a schematic cross-sectional view of a birefringent device including a circular section and an annular section in accordance with another embodiment referring to extended depth of field.

FIG. 7B is a schematic plan view of the birefringent device of FIG. 7A.

FIG. 1A shows a portion of an optical system 100 of an optical device, which may be, by way of example, an optical imaging device like a camera for consumer, industrial, surveillance or medical applications or an apparatus including a camera, for example a PDA (personal digital assistant), cell phone, computer, optical reading device, or iris recognition apparatus.

Figure 1A:
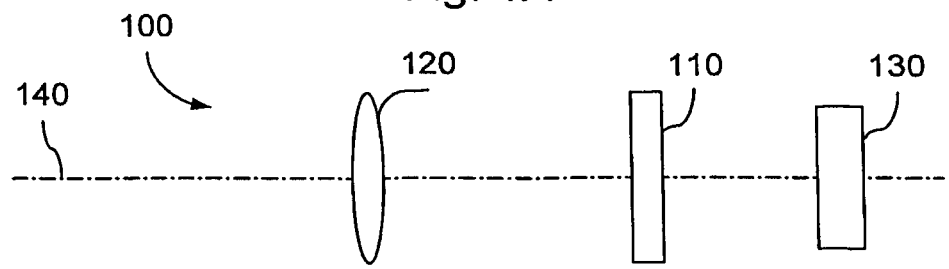
FIG. 1A is a schematic view of an optical system with a one-piece birefringent device arranged between a focusing lens unit and an image sensor unit in accordance with an embodiment of the invention.

The optical system 100 may comprise a lens unit 120 and an image sensor unit 130 arranged in the image plane of the lens unit 120. A birefringent device 110 is arranged in an optical axis 140 of the optical system 100. The optical system 100 guides non-polarized or orthogonally polarized radiation, for example visible light, to the birefringent device 110 and to the image sensor unit 130. The birefringent device 110 is configured to be mounted in the optical path of the optical device 100 and may have fixing and adjustment means, for example at or near the periphery and outside an effective area provided in the aperture (pupil) of the optical device 110. For example, the birefringent device 110 may be arranged close to the pupil plane of the optical system. According to an embodiment, the birefringent device 110 is arranged close to or at an aperture stop of the lens unit 120 or the optical system 100. The effective area of the birefringent device 110 affects the radiation (light) guided through the optical system 100 to the image sensor unit 130.

The birefringent device 110 affects different polarization directions of the non-polarized or orthogonally polarized light differently at different positions of a pupil plane. The birefringent device 110 may be configured to realize a first pupil function assigned to a first polarization direction and a second, different pupil function assigned to a second, different polarization direction, wherein the first and second polarization directions may refer to orthogonal, linear polarization directions. For example, the first polarization direction may be a horizontal polarization and the second polarization direction a vertical polarization. Other than a birefringent device sandwiched between two polarizators (polarizers), the birefringent device 110 affects more than one polarization direction.

The first and second pupil functions express the effect of the birefringent device 110 on the phase and the amplitude of the electromagnetic vectors associated to the two polarization directions of the light passing through the birefringent device 110. The pupil functions are determined such that at different positions of the birefringent device 110 light of the first polarization direction is affected differently and light of the second polarization direction is affected differently. Though the pupil functions for both polarization states may be correlated, they can be designed differently in order to improve the performance or to extend the functionality of the optical device.

The option of shaping two pupil functions provides additional degrees of freedom for improving the performance of the optical system. With regard to optical imaging devices, the pupil functions may be shaped for extending the depth of field. The degree of design freedom is high compared with conventional wave front coding approaches for shaping the depth of field.

The pupil functions may be shaped by varying the orientation of the crystal axes of the birefringent material across the pupil. According to other embodiments, the thickness of a birefringent layer may be varied position-dependently. Further embodiments concern the variation of other optical properties, for example the refractive indices for two polarization states across the birefringent device 110.

Other embodiments may use any combination of crystal axis distortion, thickness variation and variation of optical properties. All these degrees of design freedom can be utilized in an optimization procedure in order to achieve specific optical properties. The optimization may be carried out by a simulation model and some optimization algorithms, like for example particle swarm optimization or damped least squares, that run on a processor or a computer, wherein from the desired properties of the optical imaging device an objective function is derived that defines the target of the optimization process.

In accordance with an embodiment, the total pupil function of the birefringent device 110 is rotationally symmetric with respect to a symmetry point such that a rotation by an angle of 360°/n, n. 1, 2, 3 . . . , does not change the pupil function, wherein the birefringent device 110 is arranged with the symmetry point on the optical axis 140. In accordance with an embodiment, both pupil functions are point-symmetric such that a rotation by an angle of 360°/(2n), n=1, 2, 3 . . . , does not change the pupil function. For example, both pupil functions may be circularly symmetric and are functions of the distance from the symmetry point only.

According to an embodiment referring to extended depth of field, the first pupil function may be the complex conjugate of the second pupil function, wherein none of the pupil functions is "flat" in the sense that it affects the light beams homogenously. In other words, the slope or first derivation of the pupil function with regard to at least one of the coordinates is not equal zero, at least not over the whole effective area. For example, the pupil functions are step functions where the slope is not equal zero at the step. Providing a birefringent device with one of its pupil functions being the complex conjugate of the other may be used in combination with digital post-processing for image reconstruction for extending the depth of field of an optical imaging.

These embodiments basically rely on manipulating the phase of the pupil function for designing or shaping the modulation transfer function in an optical path. In contrast to conventional pupil masks, a symmetric through focus modulation transfer function can be provided, although rotationally symmetric pupil functions are utilized.

Provided a suitable design of the pupil functions in the framework of the above described restrictions, an optical device equipped with the birefringent device 110 facilitates a modulation transfer function that exhibits extended depth of field properties. In accordance with an embodiment, where the total pupil function of the birefringent device 110 is point-symmetric, for example circularly symmetric, and where the birefringent device 110 is arranged with the symmetry point on the optical axis 140, the birefringent device 110 avoids an unwanted displacement of high spatial frequency structures with respect to low spatial frequency structures, i.e. the optical transfer function is real. Point symmetry might be referred to by $p(x,y)=p(-x,-y)$, assuming the symmetry point is at $(0,0)$ and $x$ and $y$ are Cartesian coordinates in a pupil plane.

The birefringent device 110 may affect both amplitude and phase of the wavefront. In accordance with an embodiment, the birefringent device 110 exclusively affects the phase. The equations (1) and (2) refer to such an embodiment and describe the first pupil function $P_1(x)$ assigned to the first polarization direction and the second pupil function $P_2(x)$ assigned to the second polarization direction, wherein $x$ denotes a space coordinate in the pupil plane. The description refers only to $x$ as one of the two space coordinates in the pupil plane for simplicity. The first pupil function $P_1(x)$ is designed to be the complex conjugate of the second pupil function $P_2(x)$ such that the birefringent device 110 acts differently for both polarization directions:

$$P_1(x)=\exp\{+i(\theta(x)+\psi x^2)\} \quad (1)$$

$$P_2(x)=\exp\{-i(\theta(x)-\psi x^2)\} \quad (2)$$

The one-dimensional function $\theta(x)$ represents the manipulation of the angle of the complex pupil function that is caused by the birefringent device. $\psi$ represents the defocus. $\psi$ is zero for light from the focus position. For $\psi>0$, the pupil function of a beam assigned to the first polarization direction is the complex conjugate of the pupil function of a beam assigned to the second polarization direction for a defocus of $-\psi$ and vice versa. Due to this kind of symmetry, the through focus MTF becomes symmetric with respect to the focus position.

If in the optical system 100 the respective numerical apertures are not too high, the squared modulus of the Fourier Transform of the pupil function is a good approximation for the intensity point spread function. It can be shown that with complex conjugated pupil functions the point spread functions for the first and second polarization directions simply interchange their effects once the defocus value changes its sign. In other words, if the first pupil function is assigned to a first point spread function and the second pupil function is assigned to a second point spread function, then the first point spread function is symmetric to the second point spread function with respect to the image plane.

And since both states of polarization do not interfere with each other, the respective point spread functions just add on an intensity basis. Thus, for unpolarized light, in the ideal case, it will be impossible to differentiate between positive and negative values of defocus. In addition, the total pupil function of an optical system comprising the birefringent device 110 exhibits an identical shape for positive and negative values of the same magnitude of defocus such that the through focus modulation transfer function of the system is symmetric. Moreover, in accordance with other embodiments, the birefringent device 110 is utilized and designed for realizing an optical low-pass filter.

Versus a birefringent plate with only one degree of freedom for the design of the combined PSF or OTF (optical transfer function), namely the axial displacement as described in WO2007/122615A2, the performance of the approach according to the embodiments is less restricted. Other than known techniques following the third EDoF approach discussed in the background section, the birefringent device 110 provides both a symmetric through focus MTF and an OTF that is real, whereas the conventional techniques achieve either a symmetric through focus MTF or an OTF that is real.

In other words, if the first pupil function is assigned to a first point spread function and the second pupil function is assigned to a second point spread function, then the first point spread function is, in the ideal case, symmetric to the second point spread function with respect to the image plane. However, an asymmetry may be induced by the numerical apertures, which are not identical if the point spread functions are considered at two different positions along the optical axis. Since the point spread function scales with the numerical aperture, the PSFs in front of and behind the actual image plane may differ in size.

In the following, the differences to two different conventional types of phase manipulation according to the third EDoF approach will be elucidated. According to a first conventional approach the cross-section of the phase profile through the center of pupil exhibits the symmetry of an odd function. Then the through focus MTF is symmetric. Hence, high and low spatial frequency structures degrade in the same manner with increasing distance to the focus position of the system. But the angle of the complex optical transfer function becomes non-zero and hence spatial structures are laterally displaced depending on their spatial frequency and the amount of defocus. In other words, only the magnitude of the OTF, i.e. the MTF is defocus invariant, but not the angle of the OTF. This can lead to severe imaging artefacts during image reconstruction.

According to a second conventional approach covered by the third EDoF approach, the cross-section of the phase profile exhibits the symmetry of an even function. Then the symmetry of the phase profile does not cause any lateral displacement but it leads to an asymmetry of the through focus MTF. Since high and low spatial frequency structures do not degrade in the same manner with increasing distance to the in focus position of the system, the image looses either contrast or resolution depending on the sign of the defocus value.

Both effects, the displacement of structures and the non-symmetric behaviour of the through focus MTF, cannot be compensated with a non-blind deconvolution process. With the birefringent device 110, however, both shortcomings can be overcome. In addition, the birefringent device 110 provides a high degree of freedom for designing the modulation transfer function of the optical system without using complex shaped lenses, which could lower the production yield or increase production costs.

Summarizing, the birefringent device 110 overcomes the following shortcomings and disadvantages of other approaches for extending the depth of field:

Although the pupil functions may be provided rotationally symmetric, the through focus modulation transfer function can be provided symmetric with respect to an in focus position, if the phase profile for the first and second polarization directions is designed appropriately. This is typically not possible with such state of the art techniques of pupil function engineering that manipulate the pupil function for both polarization directions identically.

In addition, if the birefringent device is designed to be rotationally symmetric, the optical transfer function of the system will be real and hence spatial structures will not be displaced.

Regarding approaches referring to a rotationally symmetric manipulation of the amplitude of the pupil function in a way such that a symmetric behaviour of the through focus modulation transfer function is achieved, a significant loss of light can be avoided with the birefringent device 110, for example by pupil functions manipulating the phase exclusively. Moreover, the birefringent device 110 facilitates a greater extension of depth of field than amplitude manipulation.

With regard to approaches using colour channels, utilizing the birefringent device 110 does not necessarily require estimators for blind image convolution in an image post-processing unit. Hence, the whole image post-processing required for image reconstruction is robust, since no wrong decisions of an estimator can cause erroneous results.

Returning to FIG. 1A, the birefringent device 110 may have a position-dependent first refractive index effective for the first polarization state and a position-dependent second refractive index effective for the second polarization state, wherein each of the first and second refractive indices takes at least two different values. The gradients of the first and second refractive indices may be point-symmetric, for example circularly symmetric, with respect to a symmetry point positioned on the optical axis 140 of the optical system 100. In accordance with an embodiment, the gradient of the second refractive index is the complex conjugate of the gradient of the first refractive index such that the depth of field is significantly increased.

In accordance with another embodiment, the birefringent device 110 includes a birefringent element of one or more birefringent materials, wherein an orientation of an extraordinary axis of the birefringent material is position-dependent and varies across the birefringent element in a plane perpendicular to the optical axis of the optical system 100. According to an embodiment, the direction of the extraordinary axis changes laterally, for example radially, within the plane perpendicular to the optical axis 140 to form a pattern defining the pupil functions for the first and second polarization states completely. According to another embodiment, a pattern formed by the lateral change of the extraordinary axis contributes to the pupil functions for the first and second polarization states. The variation may be point-symmetric, for example circularly symmetric.

According to a further embodiment a thickness of one or more birefringent materials of the birefringent element may be position-dependent and may vary across the birefringent element within a plane perpendicular to the optical axis (140) to form a pattern that defines or contributes to the definition of the pupil functions. For example, a thickness gradient of the at least one birefringent material may be point-symmetric, for example circularly symmetric.

Other embodiments may combine at least two or all of refractive index variation, crystal axis distortion and thickness variation for shaping the pupil functions in order to obtain an objective function representing the desired functionality.

Figure 1B:
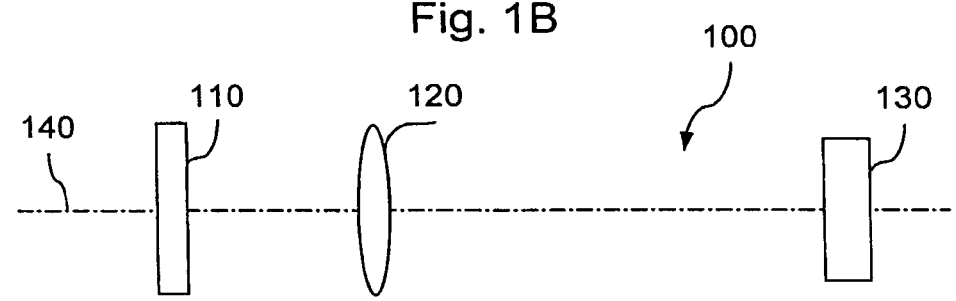
FIG. 1B is a schematic view of an optical system with a one-piece birefringent device arranged between an entrance of the optical system and a focusing lens unit in accordance with another embodiment of the invention.

FIG. 1B shows another optical system 100, where a birefringent device 110 is a one-piece device arranged between an entrance of the optical system 100 and a lens unit 120 focusing the incoming light on an image sensor unit 130. An effective area of the birefringent device 110 is within the aperture of the optical system 100.

The birefringent device 110 may be a non-lensing device which does neither converge nor diverge light beams passing through the birefringent device. According to other embodiments, the birefringent device may be additionally configured to correct aberrations caused elsewhere in the optical system 100, for example in the lens unit 120.

According to an embodiment, both pupil functions may be rotational symmetric, for example point-symmetric or circularly symmetric. The birefringent device 110 may be a one-piece device merging both pupil functions. According to further embodiments, the lens unit 120 may comprise more than one element, and the birefringent device 110 may be arranged between two lens unit elements.

Figure 1C:
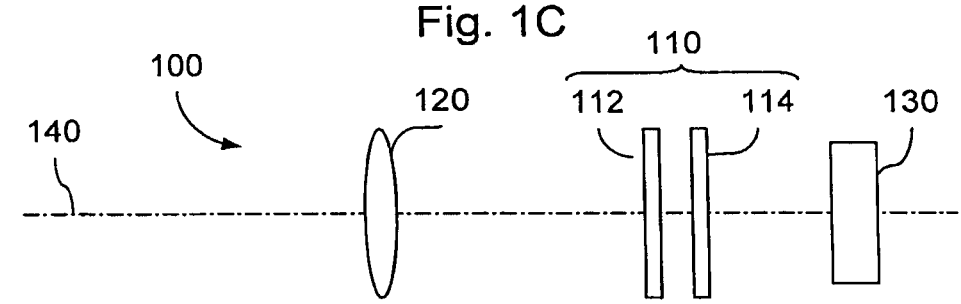
FIG. 1C is a schematic view of an optical system with a two-piece birefringent device arranged between a focusing lens unit and an image sensor unit in accordance with a further embodiment of the invention.

FIG. 1C refers to further embodiments providing the birefringent device 110 as a plurality of spatially separated sub-devices realizing different pupil sub-functions, wherein the sum of the different sub-functions result in the sum of the first and second pupil functions. For example, as illustrated in FIG. 1C, the birefringent device 110 may be a two-piece device, wherein a first sub-device 112 may realize the first pupil function and a second sub-device 114 may realize the second pupil function. All sub-devices 112, 114 are arranged between the entrance of the optical device 100 and the image plane. For example, according to the illustrated embodiment, all (both) sub-devices 112, 114 may be arranged between the lens unit 120 and the image sensor unit 130. According to other embodiments, all (both) or at least one of the sub-devices 112, 114 may be arranged between the entrance of the optical device 100 and the lens unit 120.

Figure 1D:
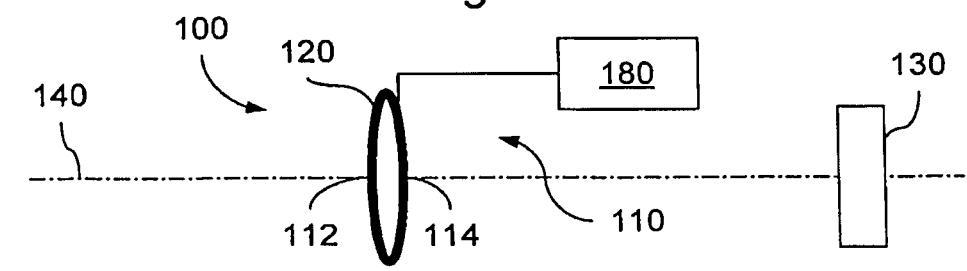
FIG. 1D is a schematic view of an optical system with a birefringent device realized as a coating of an optical element of the optical system in accordance with another embodiment of the invention.

FIG. 1D refers to embodiments providing at least a portion 112, 114 of the birefringent device 110 as a coating. The coating may me provided at any transparent element arranged in the optical path of the optical system 100, for example on one element or more elements of the lens unit 120. The pupil function may be realized by locally varying a refractive index, for example by varying physical and/or chemical properties of the coating over the effective area. In accordance with another embodiment, the coating has a thickness gradient in conformity with the respective pupil function. According to other embodiments, the pupil function of the coating results from a combination of thickness and refractive index variations.

According to an embodiment, the coating is a liquid crystal that is aligned and fixed during manufacturing. According to another embodiment, the birefringent device is realized by a liquid crystal layer which orientation of the extraordinary axis is controllable by a control unit 180. For example, the orientation of the liquid crystal can be switched between two different directions. The control unit 180 may activate and deactivate an extended depth of field feature of the optical system 100 without requiring any movable mechanical components. Moreover, a liquid crystal coating may also allow continuously changing the birefringent pupil function.

Figure 2A:
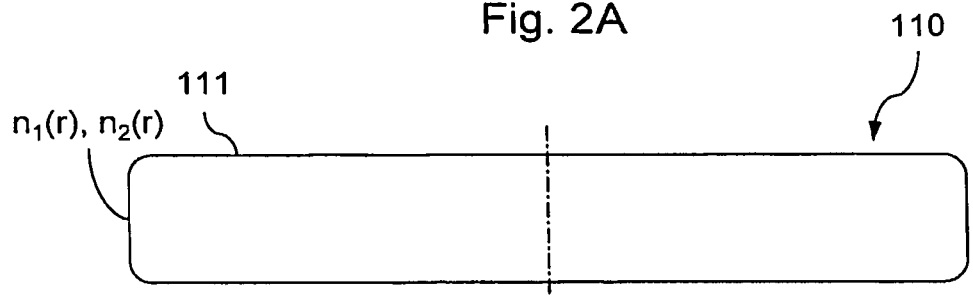
FIG. 2A is a schematic cross-sectional view of a one-piece birefringent device of homogeneous thickness according to another embodiment.

FIG. 2A illustrates a one-piece birefringent device 110 comprising a birefringent element 111 of homogenous thickness. The material of the birefringent element 111 may be any suitable material showing birefringence, for example $YVO_4$, calcite, $MgF_2$, $SiO_2$, a liquid crystal or stretched polymers. According to an embodiment the material of the birefringent element 111 is a liquid crystal or a plastics like polycarbonate. The thickness of the birefringent element 111 is at least 0.3 μm and at most 200 μm, for example at least 1.5 μm and at most 55 μm in connection with birefringence values from 0.01 to 0.3 and a phase change of n for radiation having a wavelength of 530 nm.

Figure 2B:
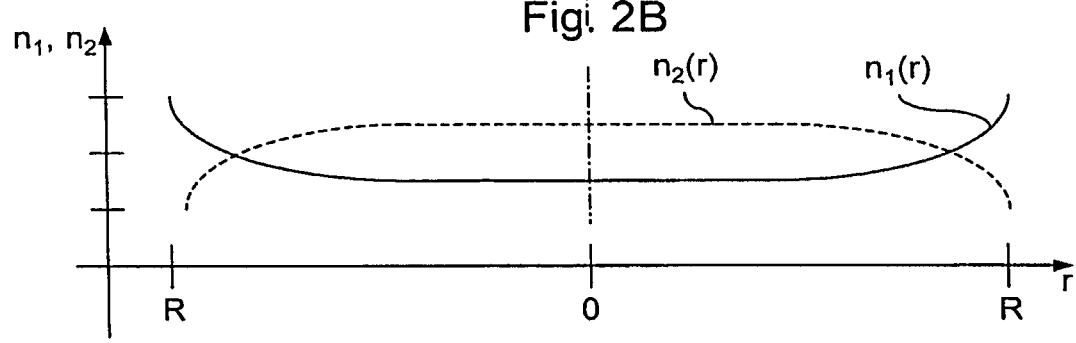
FIG. 2B is a schematic diagram illustrating the refractive index of the birefringent device of FIG. 2A.

The diagram in FIG. 2B illustrates an example for a first refractive index gradient $n_1(r,\varphi)$ effective for the first polarization direction and a second refractive index gradient $n_2(r,\varphi)$ effective for the second polarization direction. The refractive index gradients $n_1(r,\varphi)$, $n_2(r,\varphi)$ are non-flat, i.e. the slopes (also "first derivations") of the refractive index gradients are not equal zero at least in a portion of the effective area defined by the exit or entrance pupil of the respective optical system. Apart from this requirement, the actual refractive index gradients of $n_1(r,\varphi)$, $n_2(r,\varphi)$ may be adapted to the respective application. However, regardless of the respective application, the refractive index gradients $n_1(r,\varphi)$, $n_2(r,\varphi)$ of the birefringent element 111 are characterized in that they lead to pupil functions that are conjugate complex for the different polarizations.

The refractive index gradients may be rotational-symmetric to a symmetry point, which may be the center point of the effective area of the birefringent element 111. Typically, the effective area of the birefringent element 111 is a circle area. One of the refractive index gradients may monotonically increase either in steps or continuously with increasing distance to the center point. According to other embodiments, one of the refractive index gradients may strictly monotonically increase with increasing distance to the center point or may increase exponentially, either continuously or in discrete steps. According to other embodiments, the refractive index gradients may have one or more maxima or minima between the center point and the outer periphery of the effective area.

Figure 3A:
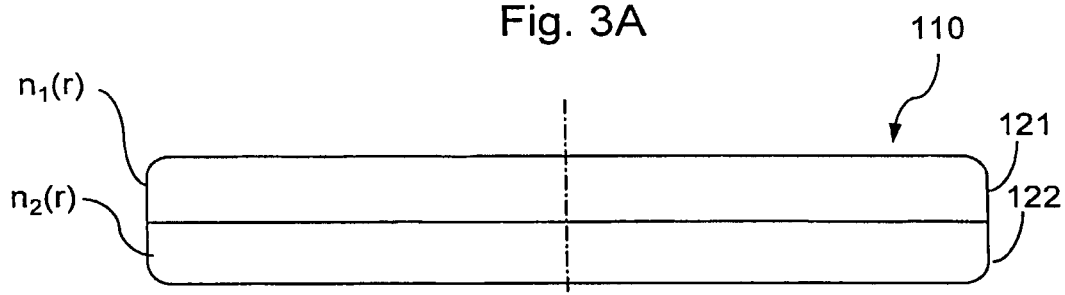
FIG. 3A is a schematic cross-sectional view of a two-piece birefringent device with two structures of homogeneous thickness according to another embodiment.
Figure 3B:
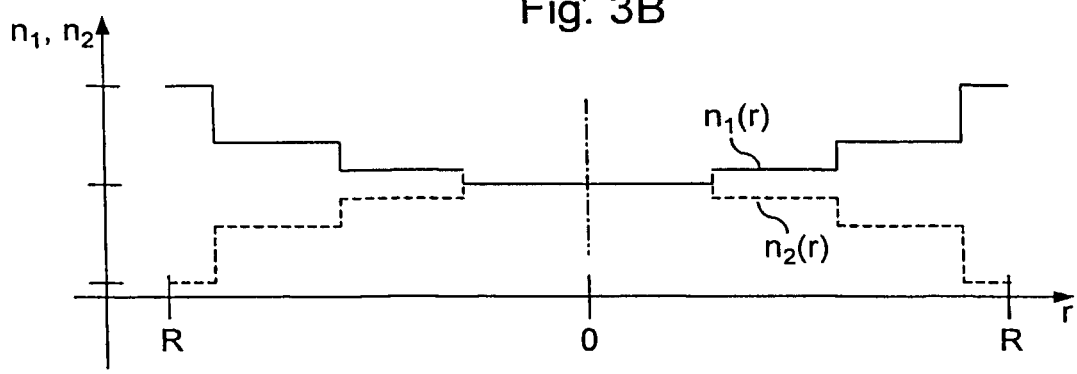
FIG. 3B is a schematic diagram showing the refractive index of the birefringent device of FIG. 3A.

FIGS. 3A and 3B refer to an embodiment where the birefringent device 110 comprises a first structure 121 in which the refractive index effective for the first polarization state changes with increasing distance to the symmetry point and a second structure 122 in which the refractive index effective for the second polarization state changes with increasing distance to the symmetry point. In accordance with the illustrated embodiment, the refractive indices $n_1(r,\varphi)$, $n_2(r,\varphi)$ change in discrete steps.

FIG. 4A is a schematic diagram showing a discretized angle of the pupil function for a first polarization state provided by a birefringent device according to an embodiment. The discretized phase angle of the pupil function is circularly symmetric and strictly monotonic increasing with increasing distance to a center point of the birefringent device. The phase angle is flat and low in a central portion up to about 85% of the radius R, is flat and high in an annular portion of the effective area, and has a steep transition between the two portions.

FIG. 4B shows the corresponding discretized angle of the pupil function for the second polarization state provided by the same birefringent device. A modulation transfer function for unpolarized light resulting from these pupil functions is almost constant up to three values of defocus in units of the Rayleigh depth of field. In addition, the MTF shows a pronounced drop such that the birefringent device fulfilling the described requirements can also be used for an optical low-pass filter for avoiding aliasing. In this case, the MTF should stay rather high for a range of spatial frequencies up to the Nyquist frequency of the image sensor and then drop steeply to zero. In accordance with further embodiments of the invention, the birefringent device provides pupil functions that facilitate both optical low-pass filtering and extended depth of field.

Figure 5A:
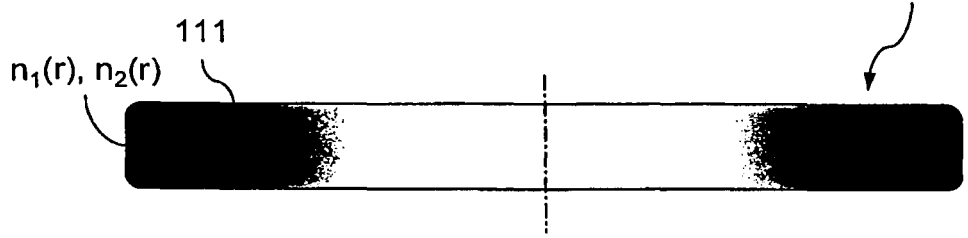
FIG. 5A is a schematic cross-sectional view of a birefringent element having a continuous impurity gradient according to another embodiment.

FIG. 5A refers to a sub-device 112 of a birefringent device with a birefringent element 111 formed as a transparent plate having a continuous refractive index gradient according to another embodiment. The continuous refractive index gradient may be generated by varying locally an impurity concentration in the transparent plate 111, by way of example. The impurity concentration may increase or decrease with increasing distance to a center point.

Figure 5B:
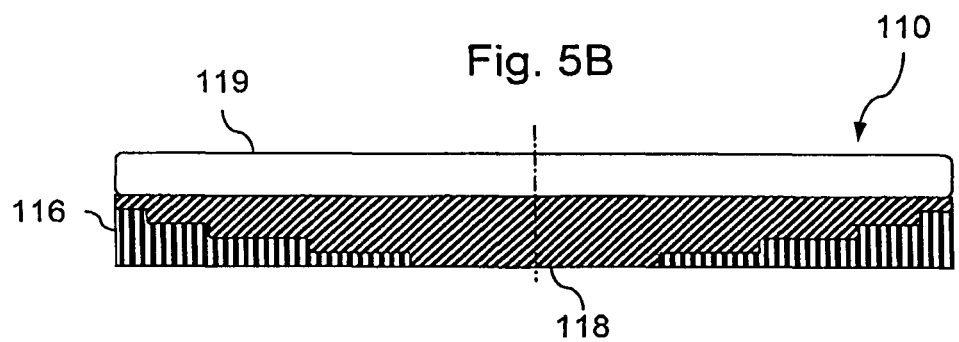
FIG. 5B is a schematic cross-sectional view of a birefringent device with a birefringent element having a stepped thickness gradient according to another embodiment.

Another birefringent device 110 is illustrated in FIG. 5B. The birefringent device 110 may comprise a transparent substrate 119 and a birefringent element formed by birefringent material 116 arranged on the transparent substrate 119. The thickness of the birefringent material 116 varies in a staggered manner, wherein the thickness changes in steps. The varying thickness of the birefringent material 116 varies the optical path length for the first and second polarization directions. A compensation layer 118 may be provided which may have the negative thickness gradient of the birefringent material and which compensates for the optical path length differences. For example, the compensation layer 118 may have a refractive index that is half the sum of the extraordinary index of refraction $n_e$ and the ordinary index of refraction $n_o$ of the birefringent material 116. Other embodiments of the birefringent device 110 may be provided without a transparent substrate 119.

Figure 5C:
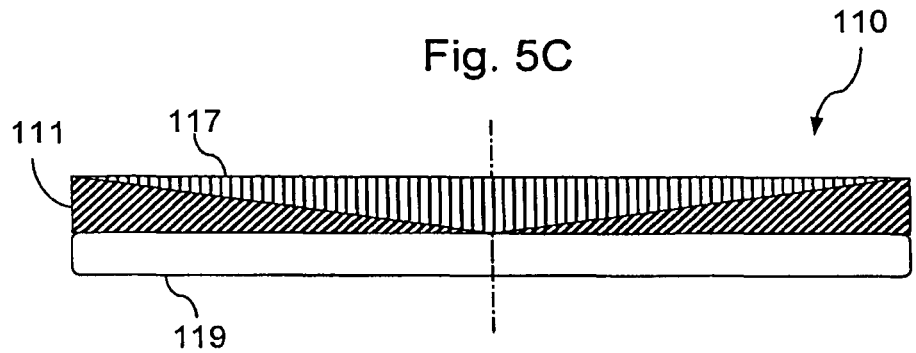
FIG. 5C is a schematic cross-sectional view of a birefringent device with a birefringent element having a linear thickness variation and a matching layer in accordance to a further embodiment.

The birefringent device 110 illustrated in FIG. 5C provides a transparent substrate 119 as a carrier for a birefringent element 111 showing a linear thickness variation from a center point to a perimeter. In addition, the birefringent device 110 comprises a compensation layer 117 compensating for optical path length differences between the two polarization directions.

Figure 5D:
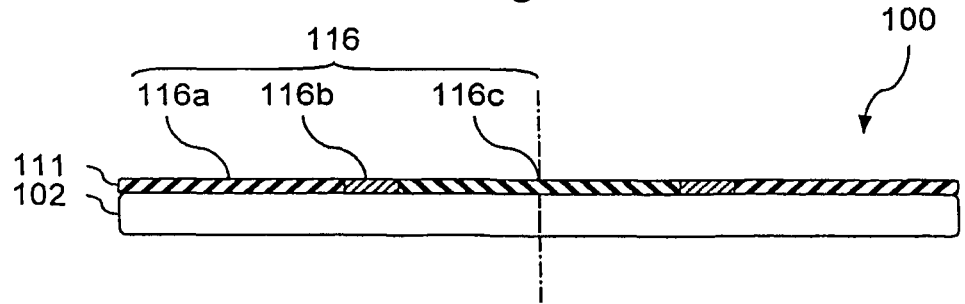
FIG. 5D is a schematic cross-sectional view of a birefringent device with a birefringent element formed as a coating.

FIG. 5D refers to a birefringent element 111 provided as a coating 116 on one of the optic elements 102 of an optical system 100. The coating 116 may include at least two different portions 116a, 116b, 116c for realizing one or two or all of refractive index variation, crystal axis distortion and thickness variation for shaping the pupil functions. According to other embodiments, the refractive index variation, crystal axis distortion and/or thickness variation change gradually.

Figure 5E:
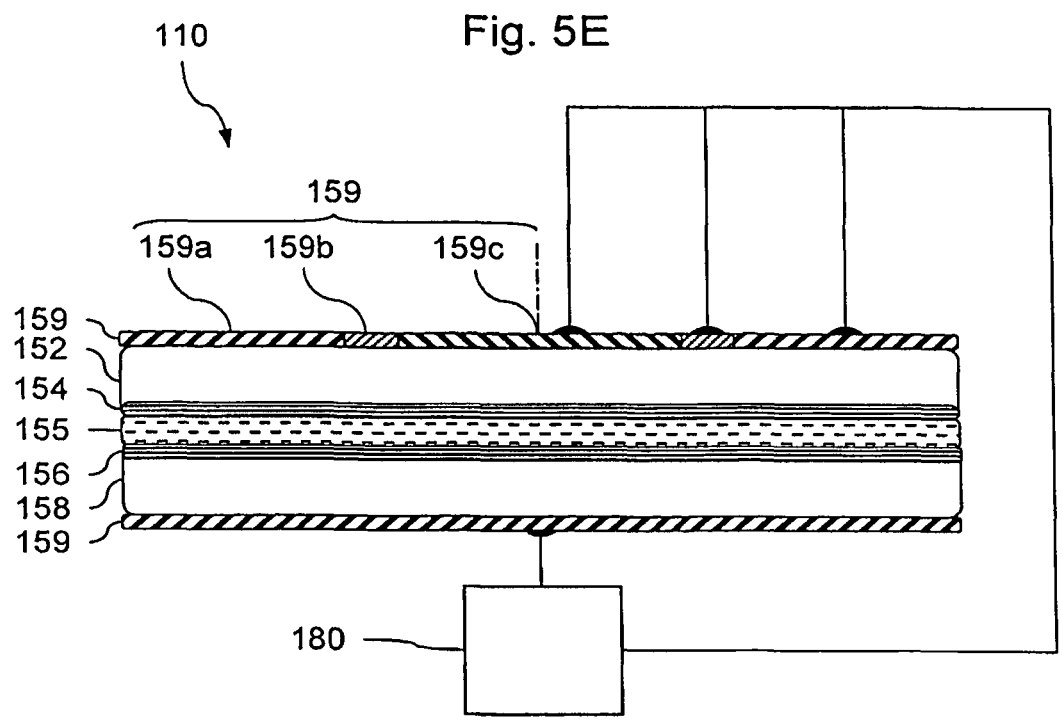
FIG. 5E is a schematic cross-sectional view of a birefringent device with a birefringent element formed by a liquid crystal.

FIG. 5E shows a birefringent device 110 including a liquid crystal 155 as birefringent element. The birefringent device 110 may further comprise two carrier substrates 152, 158 arranged in parallel, wherein the liquid crystal 155 fills a gap between the two carrier substrates 152, 158. One or both of the carrier substrates 152, 158 may include an alignment layer 154, 156 that align the liquid crystal molecules of the liquid crystal 155 in a predefined alignment direction. The alignment direction may be position-dependent, for example may vary circularly symmetric to a centre point. The predefined alignment directions may define the pupil functions completely or may at least contribute to the definition of the pupil functions.

According to an embodiment, the alignment layers are based on polymers and the orientation of at least one of the alignment layers 154, 156 may be fixed by linear photopolymerization. According to another embodiment, the liquid crystal 155 is a liquid crystal polymer and the orientation of the liquid crystal polymer is fixed by curing the polymer with UV light.

According to another embodiment, the birefringent device 110 may further comprise one or more transparent electrodes 159 arranged at least on one of the carrier substrates 152, 158. A control unit 180 may be connected with the transparent electrodes 159 and may control the orientation of the crystal axis of the liquid crystal 155 by applying suitable voltages to the transparent electrodes 155. Separately controllable sections 159a, 159b, 159c of at least one of the transparent electrodes 159 may be assigned to different regions of the liquid crystal 155, for example to a circular region and one or more annular regions surrounding the circular region.

In accordance with an embodiment, the control unit 180 is configured to control the orientation of the crystal axis contiguously such that the orientation of the complete liquid crystal 155 or a section of the liquid crystal 155 can be adjusted to an arbitrary angle between a minimum and a maximum value. According to another embodiment the control unit 180 controls the orientation in steps. According to a further embodiment, the control unit 180 switches the orientation of the crystal axis of the liquid crystal 155 between a first orientation and a second orientation differing from the first orientation.

For example, the control unit 180 may switch the orientation of the crystal axis of the liquid crystal 155 out of a plane parallel to surfaces of the carrier substrates 152, 158 and/or parallel to the plane parallel to the surfaces of the carrier substrates 152, 158.

Figure 5F:
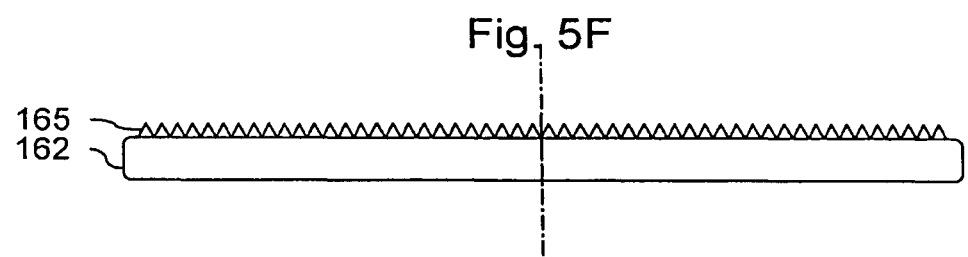
FIG. 5F is a schematic cross-sectional view of a birefringent device with a birefringent element formed by a nano grating.

FIG. 5F refers to an embodiment with a birefringent element formed as a nano grating 165 on a surface of a substrate 161 having an extraordinary refractive index parallel to the substrate surface. The nano grating can be formed by nano imprinting techniques. The pattern of the nano grating may vary continuously or in steps.

Figure 6:
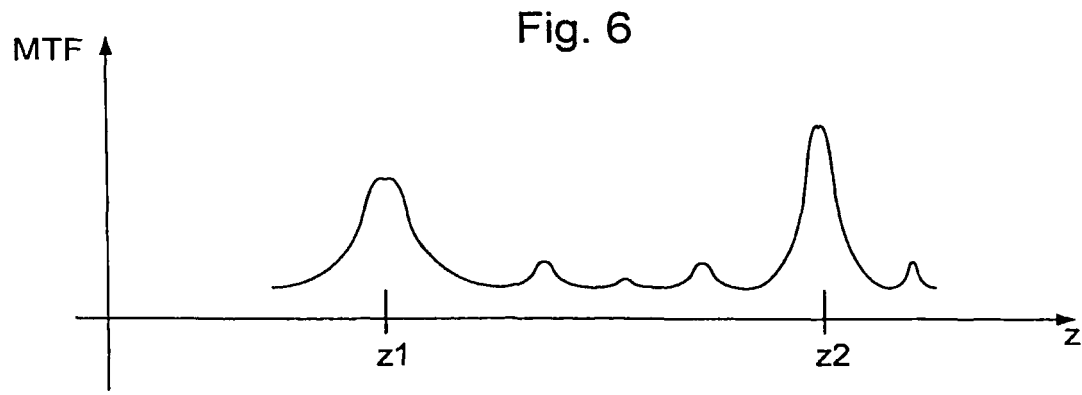
FIG. 6 is a schematic diagram of a through focus MTF for defining the pupil functions in accordance with embodiments of the invention.

FIG. 6 shows an example for a through focus MTF for one particular spatial frequency and which may be realized with a birefringent device according to the invention.

FIG. 7A illustrates a further one-piece birefringent device 110 comprising a transparent element 119 and a birefringent element 111 of homogenous thickness disposed on one side of the transparent element 119. The birefringent element 111 has an inner circular zone (section) 171 and an outer annular zone (section) 172 directly adjacent to the inner circular zone 171. The material of both zones 171, 172 may be the same birefringent material. In the annular zone 172 the birefringence axes of the birefringent material are rotated against that in the circular section 171 by 90 degrees such that the two birefringence axes are interchanged. According to other embodiments, the birefringent device 110 may include more than one annular zone with differing orientation of the birefringence axes. Other embodiments may provide a circular zone and/or one or more annular zones without birefringence, for example in addition to at least two zones with differing orientation of the extraordinary axes.

The arrows depicted in FIG. 7B indicate for both zones 171, 172 that polarization direction which is affected by the ordinary index of refraction $n_o$ and that polarization direction which is affected by the extraordinary index of refraction $n_e$.

A crystal axis of the birefringent material is aligned in an xy-plane that is perpendicular to an optical axis 140 of an image device in which the birefringent device 110 is arranged. The orientation of the crystal axis of the birefringent material changes by 90 degrees for the different zones 171, 172. Since in both zones 171, 172 the crystal axis is perpendicular to the optical axis 140, the birefringent device 110 can be considered to be an a-plate type wave plate. In accordance with other embodiments, the orientation of the crystal axis may continuously change between the centre point and the perimeter, for example in an annular region.

The material of the birefringent element 111 may be any suitable material showing birefringence, for example $YVO_4$, calcite, $MgF_2$, $SiO_2$, a liquid crystal or a plastics like polycarbonate. For example, the birefringent material of the circular section 171 has a refractive index $n_o$ for the ordinary beam and a refractive index $n_e$ for the extraordinary beam which differs from $n_o$. For example $n_e$ may be about 1.662 and $n_o$ about 1.582. The difference $\Delta n$ at a wavelength of 530 nm may be 0.08. Then the annular section 172, which is from the same material but which is rotated by 90 degrees, has an $n_o$ of about 1.662 and an $n_e$ of about 1.582. In order to achieve an optical path difference of about $\lambda/2$ at a wavelength of 530 nm, the thickness of the birefringent element may be about 3.3 μm. The birefringent device 110 as described here may provide the phase profile as illustrated in FIGS. 4A, 4B.

As shown in FIG. 7B, the ratio between the radius of the circular section 171 and the width of the annular section 172 may be about 4:1. The total diameter of the birefringent element 111 may be in the range of 0.5 mm and 2 mm.

According to an embodiment, a method of manufacturing an optical system comprises defining an application specific symmetric MTF or a real OTF. Then, from the MTF or the OTF a set of two complex conjugate pupil functions is derived. A birefringent device is formed realizing the two complex conjugate pupil functions.

According to another embodiment first an objective function (target function) is defined that represents a desired functionality, wherein the target function may be a PSF, MTF, OTF, by way of example. Using a simulation model running on a digital processing unit. Position-dependent parameters of a birefringent device are determined to realize the target function, wherein the parameters are such that they influence different polarization states differently, like crystal axes orientation, optical material properties and material thickness. Further, the simulation model may output parameters for an image restoration program for restoring the original image from the detected image.

In accordance with further embodiments, the optical devices include a processor unit configured to restore an original image from an image as detected at the image sensor unit.

The invention claimed is:

1. A birefringent device configured to be arranged in an optical path of an optical system and having an effective area to be arranged in a pupil plane of the optical system, comprising:
    a birefringent element made of a single birefringent material, wherein a direction of an extraordinary axis of the single birefringent material changes in a plane perpendicular to an optical axis of the optical system;
    a first pupil function assigned to a first polarization state;
    a second pupil function assigned to a second polarization state;
    a plurality of spatially separated sub-devices realizing different pupil sub-functions, a first sub-device realizing the first pupil function and a second sub-device realizing the second pupil function, wherein the sub-devices are arranged in the optical path of the optical system, wherein the first and the second pupil functions are controlled by at least two of a refractive index variation, a crystal axis distortion, and a thickness variation, wherein the birefringent device is arranged with a symmetry point of the first and the second pupil functions on an optical axis of the optical system, and wherein at least one of the sub-devices is formed as a coating on a lens.

2. The birefringent device of claim 1, wherein the optical system comprises:

a lens unit comprising the lens; and an image sensor unit arranged in the image plane of the lens unit.

3. The birefringent device of claim 1, wherein the first pupil function is assigned to a first point spread function and the second pupil function is assigned to a second point spread function, the first point spread function being symmetric to the second point spread function with respect to an image plane of the optical system.

4. The optical device of claim 1, wherein the birefringent device comprises a first sub-device realizing the first pupil function and a second sub-device realizing the second pupil function.

5. The optical device of claim 1, wherein the coating has a refractive index gradient as the refractive index variation defining or contributing to a definition of the respective pupil function.

6. The optical device of claim 1, wherein the coating has a thickness variation gradient as the thickness variation defining or contributing to a definition of the respective pupil function.

7. An optical device comprising:

a lens unit;

an image sensor unit arranged in the image plane of the lens unit; and the birefringent device of claim 1, wherein the birefringent device is arranged close to an aperture stop of the lens unit.

8. The optical device of claim 1, wherein the coating comprises a birefringent material, the extraordinary axis of the birefringent material changing laterally to form a pattern defining or contributing to a definition of the respective pupil function.

9. A birefringent device configured to be arranged in an optical path of an optical system, comprising:

a plurality of birefringent elements arranged in the optical path of the optical system, each birefringent element made of a single birefringent material, wherein a direction of an extraordinary axis of the single birefringent material of each birefringent element changes in a plane perpendicular to an optical axis of the optical system;

a first pupil function assigned to a first polarization state and realized by a first birefringent element of the plurality of birefringent elements;

a second pupil function assigned to a second polarization state and realized by a second birefringent element of the plurality of birefringent elements;

wherein the first and the second pupil functions are controlled by at least two of a refractive index variation, a crystal axis distortion, and a thickness variation of the respective birefringent material, wherein the plurality of birefringent elements are arranged with a symmetry point of the first and the second pupil functions on an optical axis of the optical system, and wherein at least one of the birefringent elements is formed as a coating on a lens.

* * * * *